April 24, 1956 P. M. LUFKIN 2,743,382
DEFLECTION CIRCUITS
Filed March 26, 1954
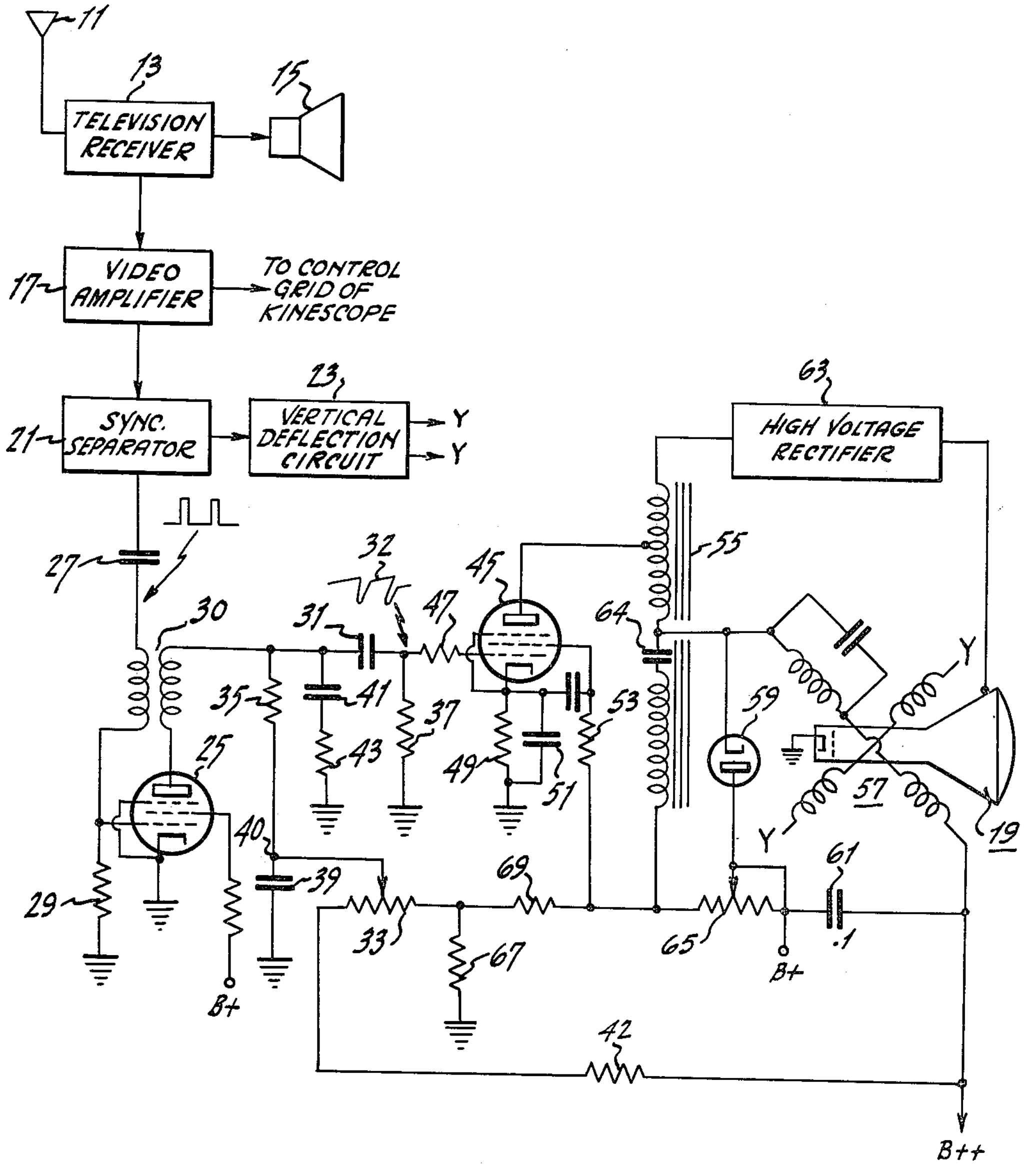
INVENTOR.
PAUL M. LUFKIN
BY 2,743,382
Patented Apr. 24, 1956

2,743,382

DEFLECTION CIRCUITS

Paul M. Lufkin, Mount Ephraim, N. J., assignor to Radio Corporation of America, a corporation of Delaware Application March 26, 1954, Serial No. 419,003

The terminal 15 years of the term of the patent to be granted has been disclaimed 13 Claims. (Cl. 315—27)

This invention relates to television, and more particularly to circuits for deflecting an electron beam to trace a raster in a cathode ray tube.

In present television practice, a picture is formed in a cathode ray tube, or kinescope, by an electron beam which is deflected to trace successive lines thereby forming a raster upon a fluorescent screen. Deflection of the electron beam is accomplished magnetically by applying sawtooth deflection current waves to the windings of a deflection yoke which is mounted about the neck of the cathode ray tube. The electron beam scans across a line of the raster as the current increases uniformly in the horizontal winding of the deflection yoke. When the sawtooth deflection wave current abruptly changes in value, the electron beam is snapped-back from the end of a scanned line to the beginning of the next.

The sawtooth wave is generated by a capacitor which accumulates charge slowly from a potential source applied through a path of relatively high resistance. The charged capacitor is then abruptly discharged through an electron tube. The sawtooth voltage thus developed is applied to a power amplifier tube, frequently termed the horizontal output tube, and a sawtooth wave of current is thereby developed. The sawtooth wave of current is impressed upon a horizontal output transformer and thence upon the horizontal winding of the deflection yoke.

The width of the scanned raster is determined by the amount of deflection imparted to the electron beam and corresponds to the amplitude of the sawtooth wave of current applied to the horizontal winding of the deflection yoke. To adjust the width of the scanned raster, it is therefore necessary to vary the amplitude of the deflection wave impressed across the horizontal winding of the yoke.

Width control has generally been accomplished by coupling a variable inductor across a portion of the horizontal output transformer. This variable inductor absorbs a portion of the power output of this transformer and thereby limits the amount of energy flow to the horizontal winding of the yoke. In a more efficient deflection system, the variable impedance may be placed in series with the yoke winding thereby directly limiting the energy transferred thereto. In both of these systems, the control impedance absorbs energy from the output transformer and the efficiency of the circuit is impaired.

It is an object of this invention to provide an improved horizontal deflection circuit having a high efficiency.

A further object of this invention is to provide an improved deflection circuit which is economical to manufacture.

A further object is to provide a deflection system that is simplified by the elimination of inductors presently used for width control and for linearity control.

According to this invention, the width of the scanned raster is controlled by a variable resistor width control coupled in series with the horizontal deflection winding and coupled also to the screen grid of the horizontal output tube and further coupled to the input circuit of the horizontal output tube. The width control functions (1) to adjust the "Q" of the deflection winding circuit, (2) to adjust the power input to the screen of the horizontal output tube and (3) to adjust the grid drive voltage to the control grid of the output tube.

Other objects of this invention will become apparent upon a reading of the following specification and an inspection of the accompanying drawing which is a circuit diagram, partially in blocks, of a television receiving system including a deflection circuit involving the present invention.

Referring to the drawing in more detail, there is shown a circuit of a television receiver including an antenna 11 which feeds signals to a television receiver circuit 13. This television receiver circuit includes a radio frequency section, a converter section, an intermediate frequency amplifier and a detector. A sound channel is indicated by a speaker symbol 15. The composite video signal is fed to a video amplifier 17 which furnishes a video signal for the control grid of the kinescope 19 and sync pulses for a synchronizing signal separator 21. The synchronizing signal separator 21 passes the vertical synchronizing pulses to a vertical deflection circuit 23. Horizontal synchronizing pulses are applied to the control grid of the electron discharge tube 25 by a capacitive coupling 27. A grid leak resistor 29 provides the control grid with proper bias. A coupling transformer 30 from anode to grid of the electron tube 25 causes this tube to operate as a blocking oscillator which is "locked-in" with the synchronizing pulses.

A capacitor 41 is slowly charged from the B+ and B++ voltage sources (at alternate sides of a capacitor 61) through resistive paths which include resistor 42, a portion of the drive control resistor 33, resistor 35 and resistor 37 for the B++ portion, resistor 65 and resistor 69, and the remainder of the drive control resistor 33 for the B+ portion. When a synchronizing pulse is applied to the control grid of the discharge tube 25, this tube conducts and abruptly discharges the capacitor 41. Capacitor 39 bypasses alternating current to ground and establishes the point 40 at A. C. ground potential. The serially connected elements, the capacitor 41 and a resistor 43, provide proper shaping for the deflection wave which is coupled to resistor 37 thru capacitor 31 which blocks the D. C. component only. The deflection wave of voltage thereby developed across the resistor 37 is applied to the control grid of a horizontal output tube 45 through a resistor 47. Cathode biasing in the horizontal output tube 45 is provided by resistor 49 and capacitor 51. The screen grid of this tube receives positive energizing potential through a resistor 53.

The sawtooth waves of current produced by the horizontal output tube 45 are applied to the horizontal output transformer 55 and thence to the horizontal winding of the deflection yoke 57. Transient oscillations which would appear in the deflection yoke circuit are damped out by a damper tube 59 which is coupled across the horizontal windings of the yoke by a coupling capacitor 61. Boosted energizing potential is developed across this capacitor 61 and is available at the terminal marked B++. High voltage pulses appearing in the horizontal output transformer during the retrace intervals are rectified by a high voltage rectifier 63 producing a high voltage for acceleration of the electron beam in the kinescope 19. The horizontal output transformer 55 is an auto-transformer type but with two windings isolated from flow of direct current between them by a capacitor 64. The horizontal winding of the deflection yoke is coupled across the lower portion of the horizontal output transformer 55 thru capacitor 64, capacitor 61 and variable resistor 65. The path thru the transformer primary, the horizontal deflection winding and thence to the oscillation-damper coupling and energizing potential boosting capacitor 61 is that of the directly coupled deflection current and that through the transformer secondary, the capacitor 64, the horizontal deflection winding, the capacitor 61, and the resistor 65 is the path of the transformed current.

Since resistor 65 is coupled into the circuit containing the deflection yoke 57, variation of this resistor will vary the impedance of the deflection winding circuit and thereby limit current flow into the horizontal winding of the yoke. Resistor 65 is also connected to the screen resistor 53 of the horizontal output tube 45 and variation of resistor 65 will change the voltage to the screen grid of the output tube. Resistor 65 is likewise coupled through a resistive network containing resistors 67 and 69 to the drive control resistor 33 and adjustment of resistor 65 will serve to vary the drive voltage applied to the charging circuit of capacitor 31. This variation will serve to vary the amplitude of the generated deflection wave 32 as it is applied to the control grid of the output tube 45.

It will therefore be appreciated that adjustment of the raster width control 65 will serve to (1) vary the impedance of the yoke circuit, (2) vary the voltage on the screen grid of the output tube 45 and (3) vary the amplitude of the deflection wave 32 as it is generated and applied to the output tube 45. The deflection circuit disclosed herein is, comparatively speaking, a high efficiency system using less stored energy and having less energy loss. The drive control exercises but slight influence upon the linearity of deflection and a good linearity of scan is obtainable without the use of an inductive linearity control. In the practice of this invention, optimum operating conditions are obtained when the drive control 33 is adjusted to the point where a sharp discontinuity of scan appears near the center of the raster and then the drive control 33 may be adjusted downward slightly until the discontinuity is no longer discernible.

It may be noted that energy from the horizontal output tube 45 is introduced into the horizontal winding of the deflection yoke via two paths, a first path constitutes a direct drive from the anode of the horizontal output tube 45 through a portion of the output transformer 55 and thence through the horizontal winding of the deflection yoke 57, a second path for the flow of energy results from transformer action since the output tube 45 is coupled to the transformer 55 and the horizontal deflection winding of the yoke 57 is likewise coupled to that transformer. By permitting a portion of the energy from the output tube to drive the horizontal deflection winding directly, a higher efficiency is achieved than if we relied upon the transformer coupling between the output tube and the yoke.

Further, this invention utilizes the fact of two paths of energy flow for width control purposes by inserting the energy absorbing device resistor 65 in that path which provides transformer action energy coupling, but not in that path which provides direct energy coupling.

Since this circuit does not require inductive linearity control or an inductive width control, the circuit will be more economical to construct and to incorporate into a commercial television receiver.

Having thus described this invention what is claimed is:

1. In a television receiver, a circuit for deflecting an electron beam in a cathode ray tube, said circuit comprising a means for generating deflection waves, amplifying means coupled to said deflection wave generating means, a deflection yoke winding, an output transformer having primary and secondary windings coupled between said amplifying means and said deflection yoke winding, a variable resistor coupled in series with said deflection yoke winding and the secondary winding of said output transformer, said variable resistor being further coupled to said amplifying means and to said deflection wave generating means, said variable resistor being operative to vary the impedance in series with said deflection yoke winding, said variable resistor being further operative to vary the amplitude of the generated deflection waves and to vary the amplification of said deflection waves.

2. In a television receiver, a circuit for deflecting an electron beam to scan a raster, said circuit comprising in combination a means for generating deflection waves, means for amplifying said deflection waves, said amplifying means including an electron tube having at least a control electrode and a screen electrode, an output transformer having a primary winding coupled to said amplifying means and having a secondary winding, a deflection yoke winding coupled to the secondary winding of said output transformer and to said amplifying means, a variable resistor for control of the width of said raster, said variable resistor having a first terminal coupled to said deflection yoke winding and a second terminal coupled to the secondary winding said output transformer; the second terminal of said variable resistor being also coupled to the screen electrode of said electron tube, the second terminal of said variable resistor being further coupled to said deflection wave generating means, whereby said variable resistor is operative to vary the impedance in the circuit of said deflection yoke winding and is further operative to vary potential to the screen electrode of said electron tube and is further operative to vary the amplitude of said generated deflection waves.

3. A deflection system for a television receiver comprising in combination a deflection wave generating circuit having a capacitor which receives charge through a resistive network, an amplifying circuit coupled to said capacitor, said amplifying circuit including an electron tube having at least a screen grid and an anode, a deflection yoke winding, a transformer having a primary winding coupled to the anode of said electron tube and having a secondary winding coupled to said deflection yoke winding, a variable resistor coupled between a low voltage point on the secondary winding of said transformer and a low voltage terminal of said deflection yoke winding, said variable resistor and the low voltage point of said transformer secondary winding being coupled to the screen grid of said electron tube, said variable resistor and the low voltage point of said transformer secondary winding being further coupled to the resistive network for charging the capacitor of said deflection wave generating circuit.

4. An electron beam deflection circuit for a television receiver comprising in combination a means for generating deflection waves, amplifying means coupled to said deflection wave generating means, a yoke winding for electromagnetically deflecting the electron beam, a transformer having a primary winding coupled to said amplifying means and a secondary winding coupled to said yoke winding, a variable resistor for controlling the amplitude of said deflection waves, a first terminal of said variable resistor being coupled to a terminal of said yoke winding, a second terminal of said variable resistor being coupled to a terminal of the secondary winding of said transformer, the second terminal of said variable resistor being further coupled to said amplifying means, the second terminal of said variable resistor being further coupled to said deflection wave generating means, said variable resistor being operable to vary the impedance coupling between said yoke winding and the secondary winding of said transformer, said variable resistor being further operative to control the degree of amplification of said amplifying means, said variable resistor being further operative to vary the amplitude of the wave generated by said deflection wave generating means.

5. In a television deflection system having a means for generating deflection waves coupled to an amplifying means which is coupled to a deflection yoke winding by the primary winding of a transformer, apparatus for controlling the amplitude of said deflection waves impressed upon said yoke winding, said apparatus comprising a controllable impedance coupling means coupled between deflection yoke winding and the secondary winding of said transformer, said controllable impedance coupling means being further coupled between said amplifying means and a source of direct voltage, said controllable impedance coupling means being further coupled between said deflection wave generating means and said source of direct voltage.

6. The television deflection system according to claim 5 wherein said controllable impedance coupling means comprises a variable resistor, a first terminal of said variable resistor being coupled to a terminal of said deflection yoke winding, a second terminal of said variable resistor being coupled to a terminal of the secondary winding of said transformer, the first terminal of said variable resistor being further coupled to a source of direct voltage, the second terminal of said resistor being further coupled to said amplifying means, the second terminal of said resistor being further coupled to said deflection wave generating means.

7. In a television receiver, a deflection system comprising in combination, means for generating deflection waves, amplifying means coupled to said deflection wave generating means, a deflection yoke winding, an output transformer having a primary winding coupled between said amplifying means and said deflection yoke winding and having a secondary winding, a controllable impedance coupling means coupled into an alternating current path between said deflection yoke winding and the secondary winding of said output transformer, said controllable impedance coupling means being further coupled into a direct current path between a source of direct voltage and said amplifying means for controlling the gain of said amplifying means.

8. The television deflection system as defined by claim 7 wherein said controllable impedance coupling means is further coupled into a direct current path between said source of direct voltage and said deflection wave generating means for control of the amplitude of the deflection wave generated by said generating means.

9. An electron beam deflection circuit for a television receiver comprising in combination, a means for generating deflection waves, amplifying means coupled to said deflection wave generating means, a yoke winding for electromagnetically deflecting the electron beam, an output transformer having a primary winding coupled between said amplifying means and said yoke winding and having a secondary winding, a variable resistor for controlling the amplitude of the deflection waves impressed upon said yoke winding, said variable resistor being coupled into an alternating current path between said yoke winding and the secondary winding of said output transformer, said variable resistor being further coupled into a direct current path between a source of direct voltage and said amplifying means, said variable resistor being operative to vary the impedance coupling between said yoke winding and said output transformer, said variable resistor being further operative to control the gain of said amplifying means.

10. The electron beam deflection circuit as defined by claim 9 wherein said variable resistor is further coupled into a direct current path between said source of direct voltage and said deflection wave generating means, said variable resistor being further operative to control the amplitude of the deflection waves generating by said deflection wave generating means.

11. An electron beam deflection circuit for a television receiver comprising in combination, means for generating deflection waves, amplifying means coupled to said deflection wave generating means, a yoke winding for electromagnetically deflecting the electron beam, an output transformer having a primary winding coupled to said amplifying means and a secondary winding coupled to said yoke winding, a variable resistor for controlling the amplitude of said deflection waves, said variable resistor being coupled into an alternating current path between said yoke winding and the secondary winding of said output transformer, said variable resistor being further coupled into a direct current path between a source of direct voltage and said deflection wave generating means, said variable resistor being operative to vary the impedance coupling between said yoke winding and said output transformer, said variable resistor being further operative to vary the amplitude of the deflection waves generated in said deflection wave generating means.

12. In a television receiver, a cathode ray beam deflecting circuit including means for generating a deflection wave, means for applying said deflection wave, a transformer having a winding coupled to said amplifying means, a deflection winding and a controllable impedance element connected in series circuit relationship across said transformer winding, direct energizing potential being applied to one terminal of said controllable impedance element, and a connection between the other terminal of said controllable impedance element and at least one of said means, thereby to vary the impedance in series with said deflection winding and simultaneously vary the amplitude of the said deflection wave.

13. In a television receiver, a cathode ray beam deflecting circuit including means for generating a deflection wave, means for applying said deflection wave, a transformer having a winding coupled to said amplifying means, a deflection winding and a controllable impedance element connected in series circuit relationship across said transformer winding, direct energizing potential being applied to one terminal of said controllable impedance element, a capacitor interposed between said one terminal of said controllable impedance element and said deflection winding, and a connection between the other terminal of said controllable impedance element and at least one of said means, thereby to vary the impedance to alternating current flow only in series with said deflection winding and simultaneously vary the amplitude of said deflection wave.

References Cited in the file of this patent

UNITED STATES PATENTS

| | | |
|---|---|---|
| 2,579,627 | Tourshon | Dec. 25, 1951 |
| 2,612,622 | Thalner | Sept. 30, 1952 |
| 2,627,052 | Helpert | Jan. 27, 1953 |
| 2,646,532 | Hazeltine | July 21, 1953 |